United States Patent Office 3,098,296
Patented July 23, 1963

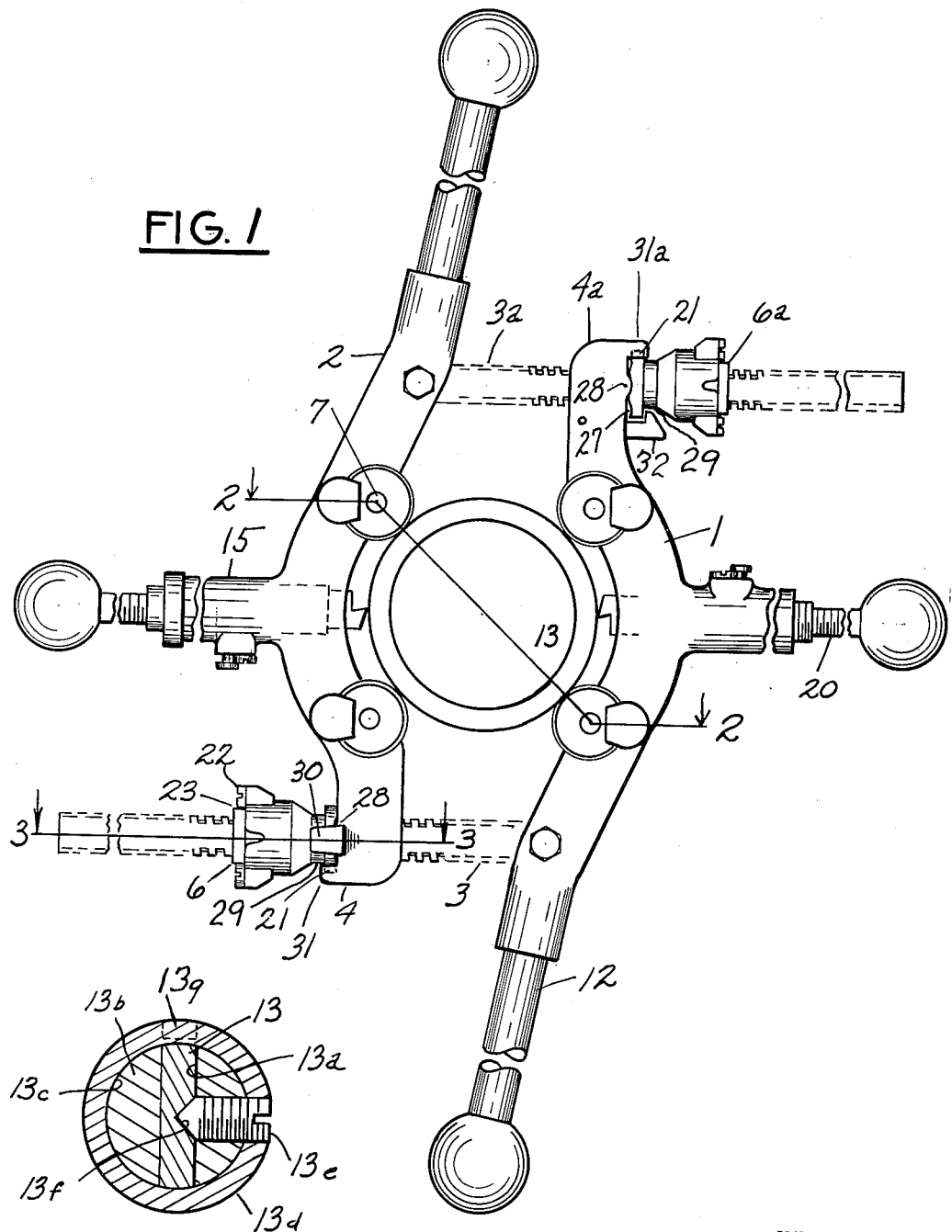

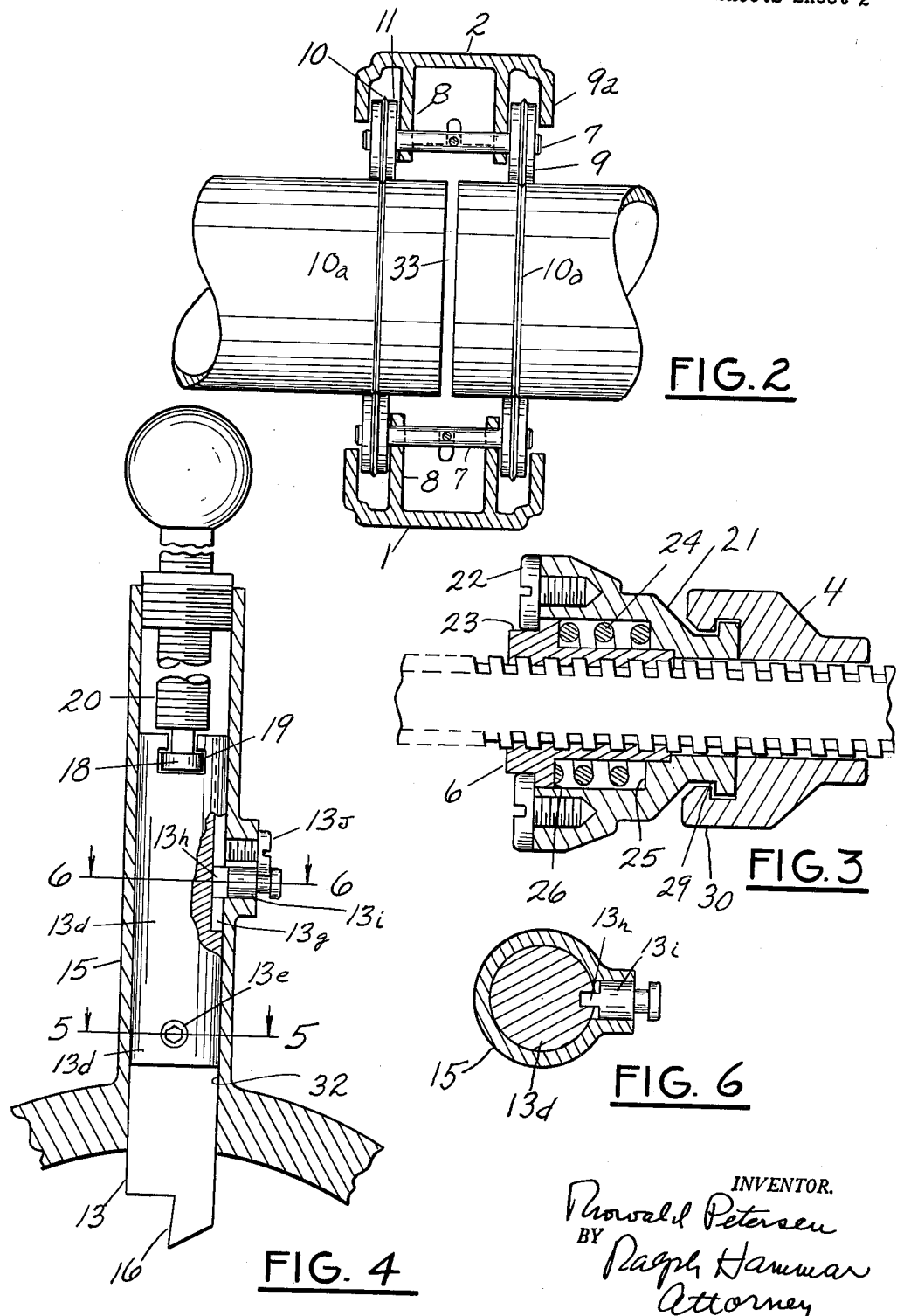

3,098,296
PIPE CUTTER
Thorvald Petersen, Erie, Pa., assignor to Reed Manufacturing Company, Erie, Pa., a corporation of Pennsylvania
Filed May 31, 1962, Ser. No. 199,081
3 Claims. (Cl. 30—95)

This invention improves the pipe cutter of Patent 2,983,043 by making it easier to change blades and to cut out-of-round pipe.

In the drawing, FIG. 1 is an end elevation of the cutter positioned on out-of-round pipe, FIG. 2 is a section on line 2—2 of FIG. 1, FIG. 3 is a section on line 3—3 of FIG. 1, FIG. 4 is a section through a holder for one of the cutting blades, FIG. 5 is a section on line 5—5 of FIG. 4, and FIG. 6 is a section on line 6—6 of FIG. 4.

The pipe cutter has symmetrical C-shaped frame sections 1 and 2. At one end of the frame section 1 is pivoted a flat link 3 received in the slotted end 4 of the frame section 2. At the opposite end of the frame section 2 is pivoted a flat link 3a received in the slotted end 4a of the frame section 1. The links are threaded to receive nuts 6 and 6a by which the frame sections may be tightened toward each other.

The frame sections 1 and 2 are of channel section as shown in FIG. 2 and four symmetrically disposed axles 7 are non rotatably anchored in the flanges 8 of the channel sections and extend parallel to the axis of the pipe. Two of the axles are arranged in the frame section 1 and the other two in the frame section 2. A pair of guide wheels 9 are journaled on the projecting ends of each axle and held thereon by tongues 9a. The wheels of each pair are axially spaced apart the same distance and each wheel has a circumferentially projecting rib 10 projecting radially beyond a wide tread section 11. When the cutter is first installed on the pipe and before the nuts 6 and 6a are tightened, the uppermost ribs 10 make contact with the upper surface of the pipe and the cutter is very easily centered on the pipe so that the ribs 10 at each end of the axles lie in the same plane. No particular skill is required for alignment of the pipe cutter square with the pipe. The cutter naturally seats on the pipe in proper alignment due to the angular spacing of the axles and axial spacing of the wheels. After the pipe cutter is mounted, the nuts 6 and 6a are tightened, forcing the narrow ribs 10 into the pipe until further penetration is stopped by contact of the tread sections 11 with the pipe. The cutter is then rotated one full revolution about the pipe by means of handles 12 on the frame sections and at the end of this revolution, the ribs 10 have generated centering grooves 10 in the pipe. Thereafter, the wide treads 11 of the wheels ride on the outer surface of the pipe without substantial penetration.

The cutting of the pipe is effected by flat cutting blades 13 received in a slot 13a in a holder 13b set in a bore 13c in a plunger 13d slidable in bosses 15, at the center of each of the frame sections 1 and 2. The blades 13 are located in a plane midway between the planes of the wheels 9. Each blade is locked in its plunger by a set screw 13e having its inner end seated in a recess 13f in the blade. The set screw is accessible for unlocking the blade when the plunger is moved slightly beyond the inner surface of the associated frame section 1 or 2, as the case may be. Each plunger has a keyway 13g receiving a key 13h in the inner end of a plunger 13i fixed in the side of each boss 15 by a screw 13j. The inner ends of the blades have cutting points 16 ground to the shape required for the material of the pipe being cut. The outer end of each plunger 13d has a transverse T-slot 18 therein rotatably receiving the circular head 19 at the end of a pressure screw 20. Turning of the pressure screw 20 advances or retracts the cutting blade depending upon the direction of rotation. The circular head 19 on the pressure screw turns freely in the T-slot 18.

Pipe is frequently out-of-round and since the treads 11 of the wheels 9 ride on the outer surface of the pipe without substantial penetration, heavy pressures are developed which makes the cutter hard to operate. This difficulty is overcome by mounting the nuts 6, 6a in sockets 21 respectively bearing on the slotted ends 4a, 4 of frame sections 1, 2. Rotation of the nuts in the sockets is prevented by the heads of screws 22 which cooperate with flats 23 on the nuts. Force is transmitted from the sockets to the nuts by coil springs 24 surrounding the nuts and arranged between seats 25 on the sockets and seats 26 on the nuts. The unstressed length of the springs is equal to or slightly greater than the maximum spacing between the seats so that when used on pipe which is perfectly round, the treads 11 bear lightly on the outer surface of the pipe and little resistance is offered. On out-of-round or irregular pipe, the springs yield and prevent build up of pressure which would make the cutter hard to operate.

Both sockets have indentations 27 in the ends which cooperate with projections 28 on the slotted ends 4, 4a of the frame section to prevent unscrewing of the nuts. The sockets are held in place on the associated frame section by catches riding in grooves 29. One of the sockets 21 is held by fixed catches 30 and projections 31 prevent movement of the link 4 out through the open end of slot 4. The other socket 21 is held by a spring catch 32 and when the catch is engaged, projections 31a prevent movement of the link 3a out through the open end of slot 4a. When the catch 32 is released, the link 3a may be moved out of the slot to permit removal of the cutter from a pipe and installation on another pipe.

In the use of the cutter, after the cutter has been aligned on the pipe and has been turned through its first revolution to establish the centering grooves 10a for the ribs 10 of the wheels 9, the cutting blades 13 are alternately advanced into the pipe. This advancing may be done while rotating. Usually, each cutting blade is advanced once during each revolution and the amount of the advance determines the depth of cut. The blade may be advanced while the cutter is rotating.

As is apparent from FIG. 3, the cutting blades cut a narrow slot 33 in the wall of the pipe, actually removing material as the slot is cut. The cutting action continues until the pipe is completely severed and the wheels 9 maintain the pipe in alignment at all times, even after the slot 33 extends completely through the wall of the pipe.

What is claimed as new is:
1. A cutter for pipe comprising a plurality of wheels spaced about the axis of the pipe, each wheel having a tread wide enough to ride on the outer surface of the pipe without substantial penetration, two frame sections respectively on opposite sides of the axis of the pipe with the ends of the frame sections opposite each other, a link connecting the ends of the frame sections opposite each other, each link being connected to one of the opposite ends of the frame sections and having a threaded end projecting through the other of the opposite ends of the frame sections, a nut screwed on the projecting end of the link, a socket slidably and non rotatably receiving the nut and bearing on said other of the opposite ends of the frame sections, a coil spring within the socket surrounding the nut, opposed shoulders on the socket and nut engaging the ends of the spring and forming a thrust transmitting connection from the nut through the spring to said other of the opposite ends of the frame sections, a cutting tool on at least one frame section in a plane perpendicular to the axis of the pipe, and means for advancing the tool into the pipe.

2. A cutter for pipe comprising a plurality of wheels spaced about the axis of the pipe, each wheel having a tread wide enough to ride on the outer surface of the pipe without substantial penetration, two frame sections respectively on opposite sides of the axis of the pipe with the ends of the frame sections opposite each other, a link connecting the ends of the frame sections opposite each other, each link being connected to one of the opposite ends of the frame sections and having a threaded end projecting through the other of the opposite ends of the frame sections, a nut screwed on the projecting end of the link, a socket slidably and non rotatably receiving the nut and bearing on said other of the opposite ends of the frame sections, a coil spring within the socket surrounding the nut, opposed shoulders on the socket and nut engaging the ends of the spring and forming a thrust transmitting connection from the nut through the spring to said other of the opposite ends of the frame sections, a boss in at least one of the frame sections, a plunger slidably guided in said boss in a plane perpendicular to the axis of the pipe, said plunger having at its outer end a connection to a screw for the plunger toward and away from the pipe, said plunger having at its inner end a slot for a flat blade cutter in a plane perpendicular to the axis of the pipe, and a set screw in the plunger accessible upon advance of the plunger toward the pipe for locking the blade in the plunger.

3. A cutter for pipe comprising a plurality of wheels spaced about the axis of the pipe, each wheel having a tread wide enough to ride on the outer surface of the pipe without substantial penetration, two frame sections respectively on opposite sides of the axis of the pipe with the ends of the frame sections opposite each other, a link connecting the ends of the frame sections opposite each other, each link being connected to one of the opposite ends of the frame sections and having a threaded end projecting through the other of the opposite ends of the frame sections, a nut screwed on the projecting end of the link, a socket slidably and non rotatably receiving the nut and bearing on said other of the opposite ends of the frame sections, one of the sockets having an external groove, a releasable catch cooperating with said groove for holding the socket in the frame section with which it is associated, a coil spring within the socket surrounding the nut, opposed shoulders on the socket and nut engaging the ends of the spring and forming a thrust transmitting connection from the nut through the spring to said other of the opposite ends of the frame sections, a cutting tool on at least one frame section in a plane perpendicular to the axis of the pipe, and means for advancing the tool into the pipe.

No references cited.